United States Patent Office 2,956,048
Patented Oct. 11, 1960

2,956,048

MANUFACTURE OF COPOLYMERS OF TRIFLUOROCHLOROETHYLENE AND VINYLIDENE FLUORIDE

Archibald N. Bolstad, Maplewood, and Francis J. Honn, Westfield, N.J., assignors to Minnesota Mining and Manufacturing Company, St. Paul, Minn., a corporation of Delaware No Drawing. Filed Mar. 18, 1955, Ser. No. 495,328

1 Claim. (Cl. 260—87.7)

This invention relates to halogen-containing thermoplastic polymeric materials. In one aspect, the invention relates to halogen-containing copolymers. More particularly in this aspect, the invention relates to resinous thermoplastic copolymers of trifluorochloroethylene and vinylidene fluoride and the method for their preparation.

Resinous thermoplastic copolymers of trifluorochloroethylene and vinylidene fluoride are found to possess a wide variety of commercial applications and utility. These resinous thermoplastic copolymers possess unusual and highly desirable chemical and physical properties which make them particularly suited as durable, relatively hard coatings for application to various metallic and other rigid surfaces. In a preferred form these copolymers are employed as coatings for metallic surfaces employed in the manufacture of aircraft component parts, e.g., aluminum surfaces of tanks and other equipment which is exposed to strong reagents. They may also take the form of protective suitings, protective envelopes, and other articles of manufacture which are comprised of exposed surfaces which may be subjected to abrasion or to other forms of impact in the course of performing their function under special environmental conditions. Particular applicability of these resinous thermoplastic copolymers is to be found when they are employed as protective coatings, such as described above, which are to be subjected to environmental conditions in which they come into contact with corrosive substances, such as oils, hydrocarbon fuels, and strong oxidizing materials and reagents, over a wide range of temperatures. For these purposes, the resinous thermoplastic copolymer may be dissolved in various solvents for application to the aforementioned surfaces.

The above-mentioned resinous thermoplastic copolymers of trifluorochloroethylene and vinylidene fluoride generally comprise trifluorochloroethylene in an amount between about 70 mole percent and about 80 mole percent, with the remaining major constituent being vinylidene fluoride. If the finished copolymer contains less than the aforementioned lower limit of approximately 70 mole percent of the trifluorochloroethylene monomer, the copolymer tends to exhibit properties of being less chemically inert to the aforementioned oxidizing materials and other powerful reagents, due to the corresponding high increase in the vinylidene fluoride monomer content. If on the other hand, the finished copolymer contains more than about 80 mole percent of the trifluorochloroethylene monomer, it is found that the copolymer becomes difficult to get into solution in various solvents, and therefore loses its desirability as an easily-applied coating or film. It will therefore become apparent that the most desirable and useful resinous thermoplastic polymers of trifluorochloroethylene and vinylidene fluoride, are those which possess as high a trifluorochloroethylene-content as possible and at the same time are readily soluble in various commercial solvents.

It is therefore an object of the present invention to provide resinous thermoplastic copolymers of trifluorochloroethylene and vinylidene fluoride having desirable physical and chemical characteristics, exhibiting a high degree of chemical inertness and corrosion-resistant properties to oils, hydrocarbon fuels, and various powerful reagents.

Another object of the invention is to provide resinous thermoplastic copolymers of trifluorochloroethylene and vinylidene fluoride, having desirable physical and chemical characteristics, exhibiting a high degree of chemical inertness and corrosion-resistant properties to oils, hydrocarbon fuels, and various powerful reagents, and which are also readily soluble in various commercial solvents and other vehicles.

Still another object of the invention is to provide a method for the manufacture of such resinous thermoplastic copolymers, having the aforementioned characteristics.

Various other objects and advantages of the present invention will become apparent to those skilled in the art from the accompanying disclosure and description.

We have found, in accordance with the process of the present invention, that resinous thermoplastic copolymers of trifluorochloroethylene and vinylidene fluoride, having superior chemical inertness and corrosion-resistant properties to oils, hydrocarbon fuels and various powerful reagents and which are also more easily brought into solution in various commercial solvents, can be prepared by copolymerizing the trifluorochloroethylene monomer with the vinylidene fluoride monomer, under polymerization conditions, in the presence of polymerization modifiers, as more fully hereinafter described. The presence of these polymerization modifiers in the polymerization recipe, results in a resinous thermoplastic copolymer, possessing superior characteristics to the resinous copolymers of trifluorochloroethylene and vinylidene fluoride heretofore obtained. In this respect, we now find that the trifluorochloroethylene monomer-content in the finished copolymer, can now be increased as a result of employing the aforementioned modifiers in the polymerization system, without imparing the ease with which the finished copolymer is brought into solution in various solvents, for application to surfaces as protective coatings. Our process, therefore, results in producing resinous thermoplastic copolymers of trifluorochloroethylene and vinylidene fluoride suitable for application to various surfaces, superior to those heretofore obtained.

In general, the aforementioned resinous thermoplastic copolymers are prepared by copolymerizing the trifluorochloroethylene and the vinylidene fluoride monomers with or without suitable filler materials at temperatures between about −25° C. and about 50° C. employing a polymerization catalyst, which is either an inorganic promoter in the form of a water-suspension type recipe, or as an organic peroxide promoter in mass or bulk-type polymerization, in the presence of a polymerization modifier. When the polymerization promoter is in the form of a water-suspension type recipe, the reaction is preferably carried out at a temperature between about 0° C. and about 35° C. When the polymerization promoter is an organic peroxide promoter in a mass polymerization system, the reaction is preferably carried out at a temperature between about −20° C. and about 0° C.

Of the water-suspension recipe type catalysts, a redox catalyst system is preferred (having no emulsifier), and contains an oxidant, a reductant, and a variable valence metal salt. The oxidant in the water-suspension type recipe is preferably an inorganic persulfate, such as potassium persulfate, sodium persulfate, or ammonium persulfate. The reductant is preferably a bisulfite, such as sodium bisulfite or potassium bisulfite. The variable valence metal salt, which is employed for the purpose of regenerating the oxidant, is preferably in the form of an iron salt, such as ferrous sulfate or ferrous nitrate, with ferrous sulfate being the most desirable variable valence metal salt.

It should be noted, however, that while the presence of the reductant and variable valence metal salt makes possible an increase in the quantity of free radicals which facilitates the ease of polymerization, nevertheless, it is also within the scope of this invention to carry out the polymerization reaction with the aforementioned water-suspension type recipe in which the recipe contains only an oxidant (e.g., one of the aforementioned peroxy compounds), and eliminates the presence of either the reductant, or variable valence metal salt, or both.

Of the organic peroxide promoters, halogen-substituted acetyl peroxides are employed in carrying out the copolymerization reaction in the absence of a suspension agent. Trichloroacetyl peroxide is a preferred promoter of this type. Other halogen-substituted organic peroxides suitable for carrying out the copolymerization reaction are trifluoroacetyl peroxide, difluoroacetyl peroxide, 2,4-dichlorobenzoyl peroxide, chloroacetyl peroxide, trifluorodichloropropionyl peroxide, and dichlorofluoroacetyl peroxide.

The polymerization modifiers of the present invention are selected from the group consisting of tertiary mercaptans, chlorinated alkanes and brominated alkanes. These tertiary mercaptans, preferably have from 4 to 20 carbon atoms per molecule. An example of such tertiary mercaptans is dodecyl mercaptan ($C_{12}H_{25}SH$). The chlorinated and brominated alkanes, may possess hydrogen and other halogen substitution, for example, fluorine, in addition to the chlorine and/or bromine substituents. Various examples of the aforementioned modifiers and methods for carrying out the copolymerization reaction, and characteristics of the resinous coating material obtained in solvents, is hereinafter disclosed.

The aforementioned polymerization modifiers of the present invention are added in amounts ranging between about 0.01 and about 20 parts by weight, per 100 parts of total trifluorochloroethylene and vinylidene fluoride monomers charged to the reaction. With respect to the aforementioned amounts of polymerization modifier employed in carrying out the polymerization reaction, it is found that the polymerization catalyst or promoter produces free radicals, which initiate polymerization of the monomers. The subsequent growing polymer-chain reacts with the modifier by abstracting halogen (chlorine or bromine) or hydrogen, thus limiting the length of the copolymer chain. Therefore, if the modifier is used in quantities above the aforementioned upper limit of about 20 parts per 100 parts of total monomers charged to the reaction zone, short chains are produced, the catalyst is wasted to a large extent and polymerization is inhibited. If, on the other hand, the modifier is employed in amounts below the aforementioned minimum quantity of 0.01 parts per 100 parts of total trifluorochloroethylene and vinylidene fluoride monomers charged to the polymerization reaction zone, the value of the polymerization modifier in obtaining a superior resinous product is not realized.

The value of the polymerization modifiers of the present invention resides in the ability to obtain a resinous copolymer, which, when dissolved in various solvents, will possess as low a solution viscosity as possible. As shown in the examples hereinafter presented, this solution viscosity should range between about 0.3 to about 1.0, when the finished resinous thermoplastic copolymer is dissolved in an amount of 0.5 weight percent in the solvent, e.g., dichlorobenzotrifluoride. Solution viscosities between about 0.3 and about 0.6 are preferred.

In carrying out the above-mentioned polymerization procedure for producing resinous thermoplastic copolymers of trifluorochloroethylene and vinylidene fluoride, in the presence of the polymerization modifiers of the present invention, it is found that the monomer reactivity ratios for trifluorochloroethylene and the vinylidene fluoride monomers are not the same. In general, the feed composition, which is charged to the polymerization reaction with the polymerization modifier, comprises between about 75 mole percent and about 90 mole percent of the trifluorochloroethylene monomer, and the remainder, insofar as the total monomer feed is concerned, is made up of vinylidene fluoride to produce copolymers having between about 70 mole percent and about 80 mole percent (and in some instances above 80 mole percent depending upon the modifier employed, as shown in the following examples) of the trifluorochloroethylene. To produce a copolymer within the preferred range in which the trifluorochloroethylene is present in an amount between about 70 and about 75 mole percent, the monomer feed composition will comprise between about 75 mole percent and about 85 mole percent of the trifluorochloroethylene. The copolymerization reaction is preferably carried out at pressures between about 85 and about 250 pounds per square inch. A more detailed description for the technique in preparing monomer feed compositions charged to the polymerization reaction will be found in the prior and copending application of Francis J. Honn, Serial No. 332,186, filed January 21, 1953, now U.S. Patent No. 2,752,332, and is therefore believed to require no further elaboration as to this point.

As previously indicated, the copolymers of the present invention are particularly suited and useful as durable, flexible coatings for application to metal or fabric surfaces, when dissolved in suitable solvents. Particularly useful solvents comprise the aliphatic and aromatic esters, the ethyl alcohols and ketones. Typical examples of these solvents are di-isobutyl ketone, methyl ethyl ketone, methyl isobutyl ketone, cyclohexanone, methoxy ethanol, ethoxy ethanol, ethoxy ethoxy ethanol, methyl acetate, butyl acetate, ethyl benzoate, tetrahydrofuran, and dichlorobenzotrifluoride.

The following examples are offered for a better understanding of the present invention and are not to be construed as limiting its scope.

Examples

| Example | Modifier | Parts of Modifier | Charge [1] Moles $CF_2=CFCl/CF_2=CH_2$ | Polymerization Time (hrs.) | Percent Conv. | 0.5% Soln.[2] Viscosity | Mole Percent $CF_2=CFCl$ in Polymer |
|---|---|---|---|---|---|---|---|
| 1 | $CHCl_3$ | 10 | 90/10 | 7.5 | 6 | 0.55 | 83 |
|   |   | 10 | 80/20 | 7.5 | 54 | 0.53 | 71 |
|   |   | 10 | 86/14 | 7.5 | 49 | 0.53 | 78 |
|   |   | 5 | 85/15 | 4.8 | 55 | 0.57 | 78 |
|   |   | 1 | 85/15 | 4.8 | 89 | 0.74 | 81.5 |
| 2 | $CCl_4$ | 10 | 90/10 | 7.5 | 63 | 0.70 | 86.5 |
|   |   | 10 | 86/14 | 7.5 | 76 | 0.68 | 80 |
|   |   | 10 | 80/20 | 7.5 | 66 | 0.61 | 74 |
| 3 | $CH_2Cl_2$ | 10 | 85/15 | 5.2 | 60 | .62 | 81.5 |
| 4 | $CH_3Cl$ | 10 | 85/15 | 3.3 | 46 | .92 | 79.5 |
| 5 | $CBr_3H$ | 2 | 80/20 | 6 | 39 | 0.45 | 76.5 |
|   |   | 2 | 86/14 | 7 | 46 | 0.46 | 81.5 |
|   |   | 1 | 85/15 | 6.5 | 59 | 0.49 | 80 |
|   |   | 1 | 80/20 | 7.5 | 62 | 0.48 | 78 |
| 6 | $CBrCl_3$ | 4 | 86/14 | 7 | 8 | .38 | 91 |
|   |   | 2 | 86/14 | 7 | 8 | .39 | 90 |
|   |   | 0.5 | 85/15 | 15 | 95 | .50 | 86.5 |
|   |   | 0.5 | 80/20 | 15 | 98 | .57 | 87 |
| 7 | $CFCl_3$ | 10 | 85/15 | 2.6 | 61 | .98 | 81 |
|   |   | 5 | 86/14 | 7 | 100 | .98 | 84 |
|   |   | 5 | 90/10 | 7 | 77 | .86 | 89.5 |
| 8 | $CF_2ClCFCl_2$ | 10 | 86/14 | 7 | 76 | .99 | 78 |
|   |   | 10 | 85/15 | 4.2 | 82 | .80 | 80 |
|   |   | 10 | 80/20 | 3.2 | 82 | .87 | 74.5 |
|   |   | 5 | 85/15 | 3.2 | 71 | .83 | 84 |
|   |   | 5 | 80/20 | 2.7 | 87 | .96 | 73 |
| 9 | $CCl_3CF_2CFClBr$ | 5 | 85/15 | 7.1 | 27 | .42 | 86 |
| 10 | $CCl_3C(=O)Cl$ | 2.5 | 86/14 | 7 | 99 | .97 | 75 |
|   |   | 2.5 | 90/10 | 7 | 95 | .84 | 89 |
| 11 | $CCl_2O$ | 1 | 85/15 | 2 | 86 | .87 | 82 |
| 12 | Dodecyl Mercaptan | 0.3 | 86/14 | 7 | 10 | 0.42 | 75 |
|   |   | 0.1 | 86/14 | 7 | 12 | 0.44 | 81 |
|   |   | 0.1 | 90/10 | 7 | 13 | 0.43 | 82 |
| 13 | None |   | 86/14 | 7.5 | 99 | 1.18 | 80 |
|   |   |   | 80/20 | 7.5 | 95 | 1.23 | 80 |
|   |   |   | 80/20 | 4 | 7 | 1.58 | 72 |
|   |   |   | 75/25 | 4 | 99 | 1.19 | 72 |

[1] Recipe (parts by wt.): Water 200; Monomers 100; $(NH_4)_2S_2O_8$ 1.0; $Na_2S_2O_5$ 0.4; $FeSO_4 \cdot 7H_2O$ 0.05. Temperature = 20° C.

[2] In dichlorobenzotrifluoride at 266° F.

It will be seen from the foregoing examples, 1 through 12, that the presence of the polymerization modifiers of the present invention in the polymerization recipe, results in obtaining a resinous thermoplastic copolymer, which, when dissolved in the solvent, results in obtaining a coating composition possessing a low solution viscosity. It will also be seen that there can also be obtained an increase in the trifluorochloroethylene content in the finished resinous copolymer over that heretofore obtained by reason of the modifier being present. For comparative purposes, the polymerization reaction shown in Example 13, in which no modifier was present in the polymerization recipe, results in obtaining a resinous copolymer, which, when dissolved in the solvent, produces a mixture having a solution viscosity so high as to make it impractical to employ these coating compositions for commercial applications. It should also be noted that various other types of polymerization recipes, may be substituted for carrying out the polymerization reaction, for those disclosed in the above examples, if so desired. In addition, various other solvents may be substituted for those disclosed in these examples.

In applying the resinous thermoplastic copolymer coatings of the present invention to various surfaces, it should be noted that such apparatus may be employed as is commercially used for spraying, dipping, or brushing. After the wet resinous thermoplastic coating has been applied to the desired surfaces, the solvent is permitted to evaporate. This may also be accomplished in the presence of elevated temperatures, if so desired. After the solvent has completely evaporated, the coated surface is now ready for use. It should also be noted that the coating compositions containing the aforementioned resinous thermoplastic copolymers, produced in accordance with the present process, may be applied to the surface either as a single coat, or if so desired, the protective coating may be built-up by the application of several layers, each layer being permitted to harden by solvent evaporation before the next layer is applied. Furthermore, if so desired, the protective coating can be suitably pigmented by adding various pigmenting agents to the coating mixture prior to application to the desired surface.

Since certain changes may be made in carrying out the process of the present invention in producing the desired resinous thermoplastic copolymers, without departing from the scope of the invention, it is intended that all matter contained in the above description is to be interpreted as illustrative and not in a limiting sense.

Having thus described our invention, we claim:

In a process for producing a resinous copolymer of 74 mol percent trifluorochloroethylene and 26 mol percent of vinylidine fluoride, which copolymer has a solution viscosity of about 0.61 cs. in a 0.5% solution of dichlorobenzotrifluoride at 266° F., by the polymerization of a monomeric mixture containing 80 mol percent of trifluorochloroethylene and 20 mol percent of vinylidene fluoride, the method for improving the solubility of the resulting copolymer in aliphatic and aromatic esters, ethyl alcohols and ketones which comprises carrying out the polymerization for a period of 7.5 hours at a temperature of 20° C. in the presence of 10 parts of carbon tetrachloride per 100 parts of total monomer.

References Cited in the file of this patent

UNITED STATES PATENTS

| | | |
|---|---|---|
| 2,434,054 | Roedel | Jan. 6, 1948 |
| 2,468,054 | Ford | Apr. 26, 1949 |
| 2,471,959 | Hunt | May 31, 1949 |
| 2,586,550 | Miller et al. | Feb. 19, 1952 |
| 2,647,107 | Barnes | July 28, 1953 |
| 2,752,332 | Honn | June 26, 1956 |